(12) United States Patent
Bragion

(10) Patent No.: US 9,258,981 B2
(45) Date of Patent: Feb. 16, 2016

(54) STRUCTURAL ARRANGEMENT FOR POST-SURGERY GARMENT FOR DOMESTIC ANIMALS AND THE LIKE

(76) Inventor: Luciana Gomes Bragion, Rio das Pedras (BR)

( * ) Notice: Subject to any disclaimer, the term of this patent is extended or adjusted under 35 U.S.C. 154(b) by 9 days.

(21) Appl. No.: 14/130,372

(22) PCT Filed: Aug. 22, 2011

(86) PCT No.: PCT/BR2011/000298
§ 371 (c)(1),
(2), (4) Date: Dec. 31, 2013

(87) PCT Pub. No.: WO2013/003917
PCT Pub. Date: Jan. 10, 2013

(65) Prior Publication Data
US 2014/0123911 A1 May 8, 2014

(30) Foreign Application Priority Data
Jul. 1, 2011 (BR) .................................. 9101440 U

(51) Int. Cl.
*A01K 13/00* (2006.01)
*A61D 9/00* (2006.01)

(52) U.S. Cl.
CPC .............. *A01K 13/006* (2013.01); *A61D 9/00* (2013.01)

(58) Field of Classification Search
CPC .................................................. A01K 13/006
See application file for complete search history.

(56) References Cited

U.S. PATENT DOCUMENTS

| 5,458,094 | A * | 10/1995 | Proshan | 119/850 |
| 6,138,611 | A * | 10/2000 | Thielemann | 119/850 |
| 6,694,924 | B2 * | 2/2004 | Clark | 119/850 |
| 2003/0168021 | A1 * | 9/2003 | Clark | 119/850 |
| 2007/0056530 | A1 * | 3/2007 | Nassour | 119/850 |

* cited by examiner

*Primary Examiner* — Kristen C Hayes
(74) *Attorney, Agent, or Firm* — Li & Cai Intellectual Property (USA) Office

(57) ABSTRACT

Structural arrangement for post-surgery garment for domestic animals and the like, more specifically a garment (1) for domestic animals (N) such as dogs and cats, inter alia, in particular used by animals on which abdominal interventions were performed, during their recovery, such as castration, caesarean section, tumor removal, etc. The garment (1) is formed by four parts, (Q1) and (Q1'), and (Q2) and (Q2'), joined at the edges thereof by longitudinal seams, (A) and (A1'), (C) and (D), (C) and (D'), both identical parts (Q1) and (Q1') having on the sides (A) and (A') two transverse seams (CO1), (CO2), (CO1'), (CO2') which form a base (AB) and (AB') that can be optionally opened. The ends are joined by sewing together parts (E) and (F), (G) and (H), (E') and (F'), and (G') and (H'). Thus, at the vertices of parts (Q1) and (Q2), (Q1') and (Q2'), cutouts (PSQ1) and (PSQ2), (PIQ1) and (PIQ2), (P1C) and (P1), (P2), (PSQ1') and (PSQ2'), (PIQ1') and (PIQ2'), (P1B) and (P1A), and (P2A) are provided, with cuffs sewn around the periphery of each cutout; parts (Q1) and (Q2), as well as (Q1') and (Q2'), are provided with longitudinal seams along the sides (C) and (D) and (C) and (D') thereof, as already mentioned, the end of the longitudinal seams being located after the central portion (LC1) and (LC2), as well as (LC1') and (LC2'); the free longitudinal edges (B) and (B') of parts (Q2) and (Q2') are provided with closure means formed by long zipper fasteners (Z) and (Z').

1 Claim, 3 Drawing Sheets

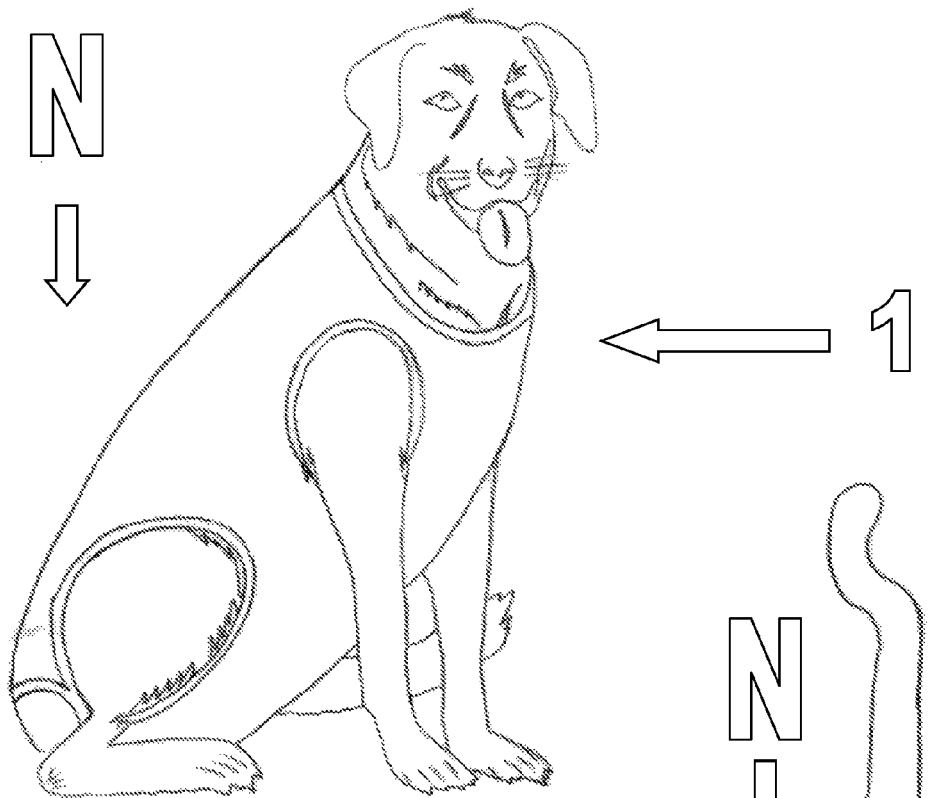
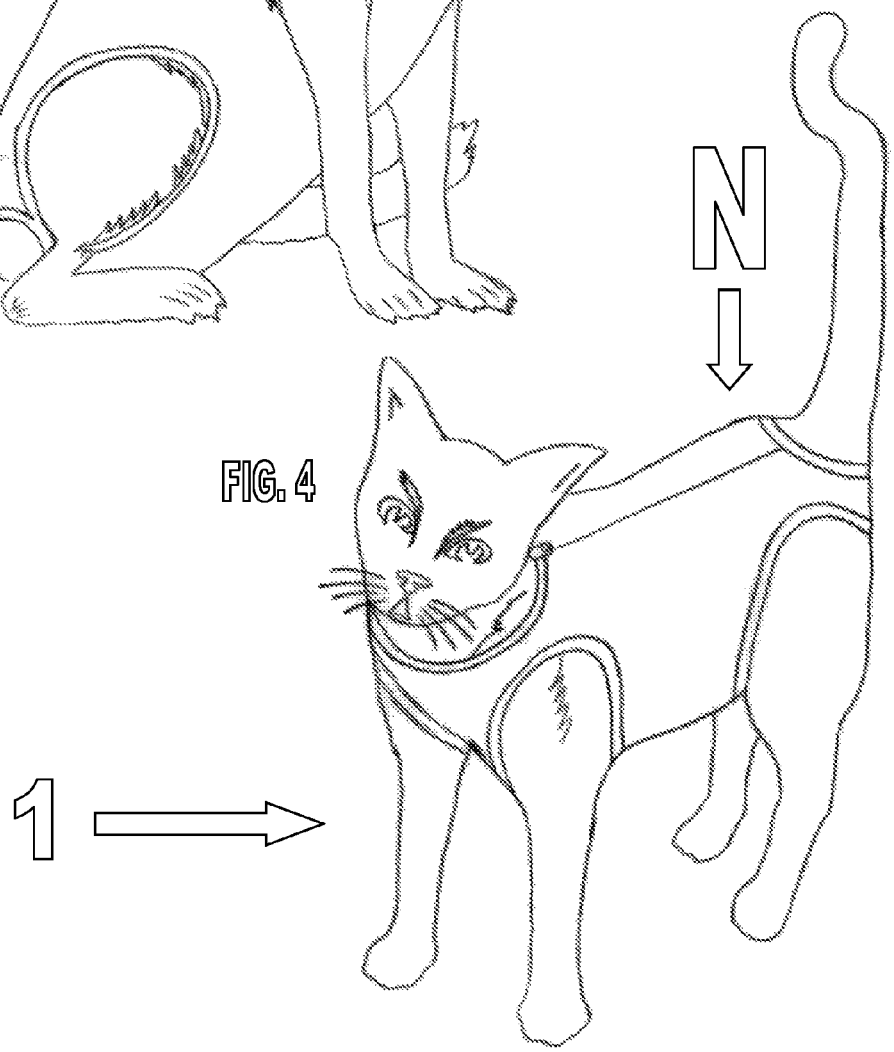

STRUCTURAL ARRANGEMENT FOR POST-SURGERY GARMENT FOR DOMESTIC ANIMALS AND THE LIKE

TECHNICAL FIELD

The present utility model deals with a new constructive arrangement incorporated in post-surgical clothing of domestic and related animals, such as dogs, cats, among others, particularly useful in the recovery of, preferably, animals which underwent abdominal surgeries such as castration, cesarean section, tumor removal, stomach surgeries, etc. while preventing contact and/or the access by the animal to drug- and dressing-protected surfaces, or even protecting areas affected by skin diseases; said post-surgical clothing is provided with an area with optional stitching so as to develop a practical and easy opening thereof by the veterinarian, owner or caretaker, allowing the genitals of the male animal to be accommodated without interfering with its bodily functions; the post-surgical clothing has a design of anatomical shape, providing greater comfort and protection to the animal, a fast and practical placing thereof due to the anatomical fit, requiring no effort by the vet, owner or caretaker and saving physical and emotional exhaustion on the part of the animal; the post-surgical clothing consists of a zipper closure and single fabric—100% cotton grip—that receives a special antibacterial treatment, which withstands up to twenty washes, and which is comfortably and anatomically placed onto the animal's body, avoiding direct contact with inappropriate materials such as metal, plastic, rubber bands, Velcro, buckles etc., which can cause allergies, discomfort and/or injury; the new post-surgical clothing is also evidenced by meeting the proposed objective because its anatomical design completely prevents the removal thereof by the animal; the way the post-surgical clothing was produced—single fabric and simple anatomical design—contributes to the production thereof, making it more efficient, comfortable and practical to be made.

BACKGROUND ART

As is well known, the most frequent abdominal surgery in female dogs or cats is castration. Castration of females is more complex than castration in males, an incision in the abdomen being necessary to remove the uterus, and ovaries.

The steps of some post-surgical care in the castration of female dogs or cats may be defined by: a) preparing the rest of the animal in a clean, quiet place with little light; b) first feeding should be provided 12 hours after surgery; c) dressing must be performed three times a day until stitches are removed; d) applying ointment and/or anti-inflammatory spray and/or bactericides.

Recovery from such abdominal surgery is extremely complicated, since total immobilization of the animal is not possible in order to prevent it from removing the bandage from the surgical incision.

Among known procedures to avoid contact of the animal with the dressing, the most common is the use of the "Elizabethan" collar in the shape of a cone, which is placed around the animal's neck from the moment that it wakes from anesthesia until stitches are removed, preventing the animal from licking or removing the dressing.

Said "Elizabethan" collar is made of a polypropylene sheet with peripheral rubber trims and straps to secure the collar on the animal. The "Elizabethan" collar is applied around the animal's neck preventing its mouth to access the dressing or site to be protected.

The drawback of this collar lies in the fact that the animal loses track of space because the collar obscures peripheral vision, which is uncomfortable for the animal to move, eat, lie down, etc.

Another apparatus used for post-surgical recovery is designated "propale" which is made of plastic material, formed by a collar that is applied around the neck and arched support applied around the chest area. The collar and support are interconnected by two side rods which limit spinal movements of the animal, preventing it from accessing the injured site. The drawback of this device lies in the fact that the animal cannot move properly for routine activities, thus staying irritated during recovery.

A simpler solution developed so that animals cannot access the site of the surgical incision is wrapping the body of the animal with a fabric. Said technique is conventional and low-cost comprising a tubular fabric whose weft is loose and easily wraps the trunk and neck of the animal; said tubular fabric needs to be cut for the passage of the animal's legs and its attachment near the trunk is made with plasters that tie the trunk and neck. The major drawback is that this type of fabric is of poor adherence and tends to move, and the weft of the fabric is fragile ripping easily.

An alternative which results from the tubular fabric is the so-called post-surgical clothing, which gives way to appropriate movement of the animal at the time of feeding, resting, etc. A known configuration is that formed by a knitted cotton-like fabric which involves the abdominal and chest region; said fabric is provided with regulating belts and respective buckles. Said buckles hinder a simple and convenient adjustment of the clothing to the animal, causing the person to waste a significant time to dress and fit the clothing in the animal, causing the same to get distressed during the placement thereof.

Despite the already mentioned drawbacks, it is important to note that all the above procedures can cause stress to the animal.

BRIEF DESCRIPTION OF OBJECT

Initially, note should be made to the fact that a prior application/process by the present applicant, filed on Jan. 24, 2008 under MU8800297-7 U2 is already ongoing, which shall be discussed briefly.

The present post-surgical clothing is made of fabric, preferably knitted cotton fabric, being formed by two identical and mirrored parts which are joined together at their major edges by means of a longitudinal seam, wherein each identical part are provided after the middle portion with side projections, which are bent and attached by overlapping to the plans of each adjacent part, by means of a seam, thus setting up a centrally joined area by simple seam. The free longitudinal edges of each part of the clothing are provided with closing means, preferably a long zipper.

In vertex portions of the plane formed by the joined identical parts, arched cutouts are provided, which receive at the peripheral outline the application of fixed rubber bands by edging and stitching.

At each resulting end of each arched cutout an elastic strip is applied which is secured by sewing to conform straps; each pair of straps is scaled to involve front and back legs, whereas the front straps are provided with a pair of buckles, which regulate the length of the strap.

However, aiming at providing enhancements to the consumer market, and especially to animals, the applicant has developed a new constructive arrangement incorporated onto post-surgical clothing of domestic and related animals, such as dogs, cats, among others, particularly useful in the recovery of, preferably, animals which underwent abdominal surgeries such as castration, cesarean section, tumor removal, stomach surgeries, etc., while preventing the contact and/or access of the animal to surfaces protected by medicines, dressings or skin diseases.

When compared to the previous application, this new constructive arrangement incorporated in post-surgical clothing of domestic and related animals has technical advances, which shall be hereinafter highlighted.

The production thereof, being of anatomical design, provides the animal with greater comfort and protection, a quick and practical placing given its anatomical fit, requiring no effort by the veterinarian, owner or caretaker and saving physical and emotional exhaustion on the part of the animal; the new post-surgical clothing consists of a zipper for closure purposes and a single fabric—100% cotton grip—which receives special bactericidal treatment, which withstands up to twenty washes, and which is comfortably and anatomically placed onto the animal's body.

As a technological improvement compared to the previous application, it is also important to note that the new post-surgical clothing, has no metal or synthetic materials, such as plastic, rubber bands, Velcro, buckles etc., thus avoiding direct contact with these materials, which could cause allergies, discomfort and/or injury; the improvement in the new postsurgical clothing also stands out since complying with the proposed objective because its anatomical design totally prevents being removed by the animal and the way in which the post-surgical clothing has been projected—single fabric and simple anatomical design—contributes to the production thereof, making it more efficient, comfortable and practical to be conceived.

Thus, the present post-surgical clothing enables full protection of the surgical incision, since it cannot be removed by the animal, avoiding stress and allowing the animal to maintain its usual movement when eating, walking, running, lying down, etc., besides being extremely easy to wear.

DESCRIPTION OF THE DRAWINGS

For the purposes of a better understanding of the features of the present utility model, and according to a preferred embodiment thereof a set of drawings are herein attached which, by way of illustration and not limitation, depict the following:

FIGS. 3 and 4 are perspective views of the post-surgical clothing applied in domestic animals.

DETAILED DESCRIPTION OF THE OBJECT

Figure 1:
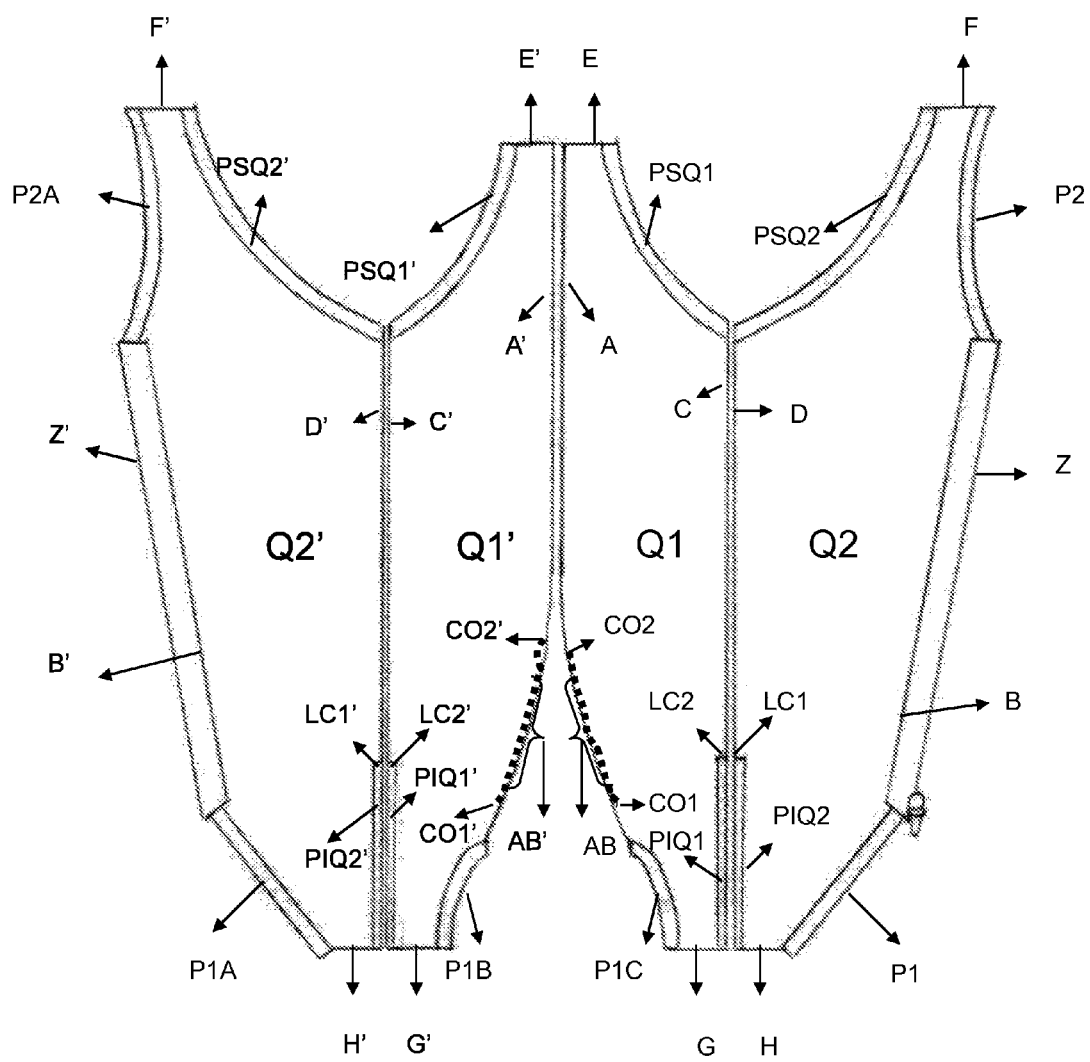
FIG. 1 is a plan view of the four parts making up the relevant clothing.
Figure 2:
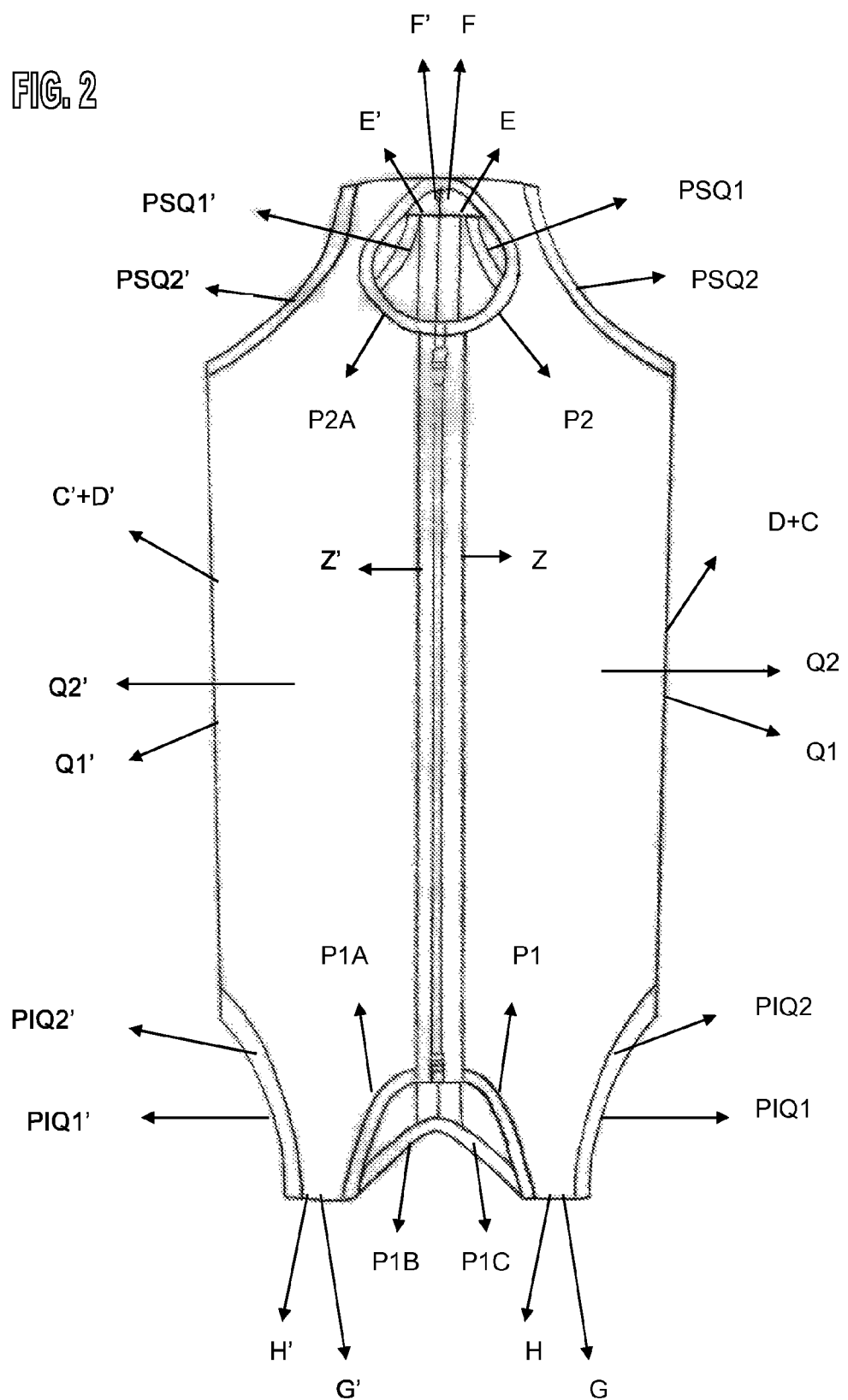
FIG. 2 is a plan view of the four parts making up the clothing, in a joined state.

With reference to the drawings, the present Utility model relates to a new "CONSTRUCTIVE ARRANGEMENT INCORPORATED IN POST-SURGICAL CLOTHING OF DOMESTIC OR RELATED ANIMALS", more precisely being a clothing (1) for domestic animals (N) such as dogs, cats, among others, who underwent abdominal surgeries such as castration, cesarean section, tumor removal, etc.

Said clothing (1) is made of single fabric—100% cotton grip—which receives special antibacterial treatment, which withstands up to twenty washes, a zipper closure, consisting of four parts (Q1) and (Q1'), (Q2) and (Q2'), which are joined at their edges by a longitudinal seam (A) and (A'), (C) and (D), (C') and (D'), wherein each identical part (Q1) and (Q1') is provided on its side (A) and (A'), with two transverse seams (CO1), (CO2), (CO1') (CO2') forming an optional opening base (AB) and (AB'), easily broken by the veterinarian, owner or caretaker, to satisfy mainly male animal needs, since it facilitates the accommodation of genitals, thus allowing normal operation of basic needs.

The ends are connected by sewing the parts (E) and (F), (G) and (H), (E') and (F') and (G') and (H'). So being, the vertices of parts (Q1) and (Q2), (Q1') and (Q2') are provided with cutouts (PSQ1) and (PSQ2), (PIQ1) and (PIQ2), (P1C) and (P1), and (P2), and (PSQ1') and (PSQ2'), (PIQ1') and (PIQ2'), (P1B) and (P1A) and (P2A), wherein each receives at its peripheral outline, the application of straps by sewing.

As previously said, parts (Q1) and (Q2) and (Q1') and (Q2') are provided at their sides (C) and (D) and (C') and (D') with a longitudinal seam wherein the limit is located after the middle portion (LC1) and (LC2) and (LC1') and (LC2').

The free longitudinal edges (B) and (B') of parts (Q2) and (Q2') are provided with closing means formed by a long zipper (Z) and (Z'). Said post-surgical clothing (1) can be made in different sizes, materials and fabrics, allowing it to be used on animals (1) of small, medium and large sizes.

While the preferred embodiment of the present utility model has been described, any modifications and/or changes must be understood as within the scope of the utility model, fitting perfectly the criteria defining it, namely the combination and modification of elements already known in new form or arrangement, resulting in functional improvement in the use or production thereof.

The invention claimed is:

1. A constructive structure for a post-surgical clothing for domestic animals, comprising:
    a first body part (Q1);
    a second body part (Q1');
    a third body part (Q2);
    a fourth body part (Q2'); and
    wherein the first body part (Q1) has a left side edge (A), a right side edge (C), a top side edge (E), a concaved right upper portion (PSQ1), a bottom side edge (G), wherein the left side edge (A) includes an upper straight line side edge and a lower slant curve side edge, a concaved lower portion (P1C) is formed close to the bottom side edge (G) along the lower slant curve side edge of the left side edge (A);
    wherein the second body part (Q1') has a right side edge (A') and a left side edge (C'), a top side edge (E'), a bottom side edge (G'), a concaved left upper cutout portion (PSQ1'), wherein the right side edge (A') includes an upper straight line edge and a lower slant curve side edge, a concaved lower portion (P1B) is formed close to the bottom side edge (G) along the lower slant curve side edge of the right side edge (A');
    wherein the first body part (Q1) and the second body part (Q1') are seamed together along the upper straight line side edge of the left side edge (A) and the upper straight line edge of the right side edge (A'), the top side edge (E) of the first body part (Q1) and the top side edge (E') of the second body part (Q1') are arranged adjacent to each other, the lower slant curve side edge of the left side edge (A) and the lower slant curve side edge of the right side edge (A') are arranged traversely separated from each other;
    wherein the third body part (Q2) has a left side edge (D) and a right slant side edge (B), a left upper concaved portion (PSQ2), a right upper concaved portion (P2), a top side edge (F) formed between the left upper concaved portion (PSQ2) and right upper concaved portion (P2), a bottom side edge (H), and a slant right lower side edge (P1) formed between a lower end of the right slant side edge (B) and the bottom side edge (H);

wherein the first body part (Q1) and the third body part (Q2) are seamed together along the right side edge (C) of the first body part (Q1) and the left side edge (D) of the third body part (Q2), a first opening (P1Q1) is formed on a lower portion of the first body part (Q1) along the right side edge (C), a second opening (P1Q2) is formed corresponding to the first opening (P1Q2) on a lower portion of the third body part (Q2) along the left side edge (D);

wherein the fourth body part (Q2') has a left slant side edge (B') and a right side edge (D'), a left upper concaved portion (P2A), a right upper concaved portion (PSQ2'), a top side edge (F') formed between the right upper concaved portion (PSQ2') and the left upper concaved portion (P2A), a bottom side edge (H'), and a slant left lower side edge (P1A) formed between a lower end of the left slant side edge (B') and the bottom side edge (H');

wherein the second body part (Q1') and the fourth body part (Q2') are seamed together along the left side edge (C') of the second body part (Q1') and the right side edge (D') of the fourth body part (Q2'), a third opening (P1Q1') is formed on a lower portion of the second body part (Q1') along the left side edge (C'), a fourth opening (P1Q2') is formed corresponding to the third opening (P1Q2') on a lower portion of the fourth body part (Q2') along the right side edge (D');

wherein a first optional opening structure (AB) is formed on the lower slant curve side edge of the left side edge (A) of the first body part (Q1) and a second optional opening structure (AB') is formed on the lower slant curve side edge of the right side edge (A') of the third body part (Q1') corresponding to the first optional opening structure (AB);

wherein a first zipper structure (Z) is installed on the right slant side edge (B) of the third body part (Q2), and a second zipper structure (Z') is installed on the left slant side edge (B') of the fourth body part (Q2) corresponding to the first zipper structure (Z);

wherein, when in use, the top side edge (E) of the first body part (Q1) and the top side edge (F) of the third body part (Q2) are sewed together, the bottom side edge (G) of the first body part (Q1) and the bottom side edge (H) of the third part body (Q2) are sewed together, the top side edge (E') of the second body part (Q1') and the top side edge (F') of the fourth body part (Q2') are sewed together, the bottom side edge (G') of the second body part (Q1') and the bottom side edge (H') of the fourth body part (Q2') are sewed together, the first zipper structure (Z) and the second zipper structure (Z') are zipped together, the lower slant curve side edge of the left side edge (A) of the first body part (Q) and the lower slant curve side edge of the right side edge (A') of the third body part (Q1') are sewed together, the first optional opening structure (AB) and the second optional opening structure (AB') are attached together, thus the concaved right upper portion (PSQ1) of the first body part (Q1) and the concaved left upper portion (PSQ2) of the third body part (Q2) form an opening for accommodating the right front leg of a pet, the concaved left upper portion (PSQ1') of the second body part (Q1') and the concaved right upper portion (PSQ2') of the fourth body part (Q2) form an opening for accommodating the left front leg of the pet, the first opening (P1Q1) formed on the first body part (Q1) and the second opening (P1Q2) formed on the third body part (Q2) form an opening for accommodating the right rear leg of the pet, the third opening (P1Q1') formed on the second body part (Q1) and the fourth opening (P1Q2') formed on the fourth body part (Q2) form an opening for accommodating the left rear leg of the pet, the concaved lower portion (P1C) of the first body part (Q1), the concaved lower portion (P1B) of the second body part (Q2), the slant right lower side edge (P1) of the third body part (3) and the slant right lower side edge (P1A) of the fourth body part (Q2') form an opening for accommodating the tail of the pet; and wherein the attached first optional opening structure (AB) and second optional opening structure (AB') is opened when accommodating the genitals of a male pet.

* * * * *